United States Patent
Heier (10) Patent No.: US 8,294,430 B2
(45) Date of Patent: Oct. 23, 2012

(54) DOUBLE-FED ASYNCHRONOUS GENERATOR AND METHOD FOR ITS OPERATION

(75) Inventor: Siegfried Heier, Baunatal (DE)

(73) Assignee: Universitaet Kassel, Kassel (DE)

( * ) Notice: Subject to any disclaimer, the term of this patent is extended or adjusted under 35 U.S.C. 154(b) by 332 days.

(21) Appl. No.: 12/670,444

(22) PCT Filed: Jul. 28, 2008

(86) PCT No.: PCT/DE2008/001246
§ 371 (c)(1),
(2), (4) Date: May 3, 2010

(87) PCT Pub. No.: WO2009/012776
PCT Pub. Date: Jan. 29, 2009

(65) Prior Publication Data
US 2010/0207589 A1 Aug. 19, 2010

(30) Foreign Application Priority Data
Jul. 26, 2007 (DE) .......................... 10 2007 035 570

(51) Int. Cl.
*H02P 11/00* (2006.01)
*H02P 9/00* (2006.01)
*H02H 11/00* (2006.01)
*F03D 9/00* (2006.01)
*H02P 9/04* (2006.01)

(52) U.S. Cl. ............................... 322/29; 290/44; 290/55

(58) Field of Classification Search .................. 322/29; 290/44, 55
See application file for complete search history.

(56) References Cited

U.S. PATENT DOCUMENTS

| 3,648,138 | A | * | 3/1972 | Kalis | 318/801 |
| 4,115,729 | A | * | 9/1978 | Young et al. | 322/86 |
| 5,182,701 | A | * | 1/1993 | Mochikawa et al. | 363/98 |
| 5,280,419 | A | * | 1/1994 | Amler | 363/37 |

(Continued)

FOREIGN PATENT DOCUMENTS

DE    101 19 624    11/2002

(Continued)

OTHER PUBLICATIONS

Siegfried Heier: "Windkraftanlagen" 4-th Edition, B.G. Teubner-Verlag, Stuttgart, 2005 pp. 119, 98-99, 324-327.

*Primary Examiner* — Pedro J Cuevas
(74) *Attorney, Agent, or Firm* — Michael J. Striker (57) ABSTRACT

The invention relates to a double-fed asynchronous generator, which is provided with a slipring rotor (1b), and to a method for its operation. In the normal manner, the asynchronous generator has a machine-side converter (5) and a network-side converter (6). According to the invention, the asynchronous generator is designed to supply short-circuit power in that at least one machine-side rotor current (iRM) is maintained in the event of a short circuit, in order to allow the formation of a stator-side short-circuit current. In order that inherent short-circuit currents in sensitive components of the converters (5, 6) are nevertheless avoided, at least the machine-side rotor current (iRM) is maintained in such a way that the actual rotor current (iRMact) in the event of a short circuit is used as the new nominal value in a control apparatus for the asynchronous generator.

11 Claims, 5 Drawing Sheets

U.S. PATENT DOCUMENTS

| | | | | |
|---|---|---|---|---|
| 5,552,977 | A * | 9/1996 | Xu et al. | 363/41 |
| 5,708,346 | A * | 1/1998 | Schob | 318/803 |
| 5,847,943 | A * | 12/1998 | Vogel | 363/37 |
| 6,137,187 | A | 10/2000 | Mikhail et al. | 290/44 |
| 6,420,795 | B1 * | 7/2002 | Mikhail et al. | 290/44 |
| 6,847,128 | B2 * | 1/2005 | Mikhail et al. | 290/44 |
| 6,856,039 | B2 * | 2/2005 | Mikhail et al. | 290/44 |
| 6,954,004 | B2 * | 10/2005 | Skeist et al. | 290/44 |
| 6,995,539 | B1 * | 2/2006 | Hansson et al. | 318/800 |
| 7,095,131 | B2 * | 8/2006 | Mikhail et al. | 290/44 |
| 7,102,304 | B2 * | 9/2006 | Sebille et al. | 318/108 |
| 7,411,309 | B2 * | 8/2008 | Hudson | 290/44 |
| 7,462,946 | B2 | 12/2008 | Wobben | 290/44 |
| 7,462,947 | B2 | 12/2008 | Wobben | 290/44 |
| 7,746,039 | B2 * | 6/2010 | Hoffmann et al. | 322/89 |
| 8,143,734 | B2 * | 3/2012 | Steudel et al. | 290/44 |
| 8,169,097 | B2 * | 5/2012 | Weitkamp | 290/44 |
| 2002/0105189 | A1 * | 8/2002 | Mikhail et al. | 290/44 |
| 2004/0094964 | A1 * | 5/2004 | Mikhail et al. | 290/44 |
| 2004/0207208 | A1 * | 10/2004 | Mikhail et al. | 290/44 |
| 2005/0012487 | A1 * | 1/2005 | Skeist et al. | 318/727 |
| 2005/0253396 | A1 * | 11/2005 | Mikhail et al. | 290/44 |
| 2006/0108954 | A1 * | 5/2006 | Sebille et al. | 318/108 |
| 2007/0052244 | A1 * | 3/2007 | Hudson | 290/44 |
| 2007/0057514 | A1 * | 3/2007 | Mukai et al. | 290/40 C |
| 2007/0182384 | A1 * | 8/2007 | Shirakawa et al. | 322/99 |
| 2007/0200346 | A1 * | 8/2007 | Kanazawa et al. | 290/40 B |
| 2008/0190680 | A1 * | 8/2008 | Kaneko et al. | 180/170 |
| 2009/0224543 | A1 * | 9/2009 | Steudel et al. | 290/44 |
| 2010/0013227 | A1 * | 1/2010 | Weitkamp | 290/44 |
| 2011/0169435 | A1 * | 7/2011 | Konig | 318/400.3 |

FOREIGN PATENT DOCUMENTS

| | | |
|---|---|---|
| EP | 1 790 850 | 5/2007 |
| EP | 1 914 877 | 4/2008 |
| EP | 1 919 076 | 5/2008 |
| WO | 02/086314 | 10/2002 |
| WO | 2004/008627 | 1/2004 |

* cited by examiner

DOUBLE-FED ASYNCHRONOUS GENERATOR AND METHOD FOR ITS OPERATION

The present invention relates to a method for operating a double-fed asynchronous generator and an asynchronous generator that is suited for this purpose, according to the preambles of claims 1 and 7, in particular for performing mechanical-electrical energy conversion in wind power stations.

In order for power supply networks to operate reliably, the supply systems that are used must be available, and special safeguards against short circuits must be provided for the electrical devices and systems used in the network. Protective devices are typically provided for this purpose in the form of fuses, switches, or the like, which are triggered by short-circuit currents that flow briefly when a short circuit occurs, thereby decoupling the devices and systems connected thereto from the network. "Briefly" means that the short-circuit current is present for a period of, e.g., 20 ms to 200 ms, and must reach a level that is, e.g., 5 or 15 times greater than the nominal current. If available protective devices are not triggered, e.g., because a short-circuit current occurs too briefly or at an inadequate level, this may have serious consequences, including, in particular, the destruction of the devices and systems to be protected.

A further problem is that, via the occurrence of short-circuit currents referred to here as "inherent", short circuits may also destroy lines and sensitive components in the supply systems themselves, as described in detail below.

In contrast to other systems used to generate electrical energy, such as water, steam, and gas turbines, wind power stations are subjected to long-term, meteorologically induced, stochastic changes, and to short-term, usually periodic fluctuations in torque and power output. The mechanical energy of rotation of the turbine of a wind power station (e.g., 20 RPM in the megawatt range) is therefore converted into electrical energy either without the use of a transmission, as in the case of large generators, or with the use of suitable transmissions (e.g., approximately 1000 RPM), as in the case of commercially available electrical machines; the electrical energy is supplied to an electrical power supply network directly or via electronic converters.

An overview of common energy conversion systems that are more or less suited for use in wind power stations is provided in the book entitled "Windkraftanlagen" (Wind Power Stations) (PD Dr.-Ing. habil. Siegfried Heier, Edition 4, B.G. Teubner-Verlag (publisher), Stuttgart). It makes known, e.g., synchronous generators that are coupled directly to the network (S. Heier, page 119, figure g). This design, which is commonly used in power stations, has not been used successfully in wind power stations due to strong turbine fluctuations, the fact that it operates at a stable rotational speed, and is susceptible to fluctuations which result in high loads being placed on the drive train, and has therefore only been used so far in pilot projects.

Wind power stations having outputs of up to approximately 1 MW have been operated primarily using asynchronous generators that include short-circuit rotors and are coupled directly to the network (S. Heier, Ibid., page 119, figure a); due to their flexibility in terms of rotational speed, they act in a vibration-damping manner in this energy range. Asynchronous generators of that type are less suited for use in wind power stations having greater outputs, starting, e.g., at 1.5 MW, due to slight slippage. Synchronous and asynchronous generators, in particular, are interesting for use in this power range; they are operated in combination with converters to decouple the generator frequency from the network frequency. Converters of that type are provided with rectifiers, direct-current intermediate circuits, and inverters, and are therefore capable of delivering alternating current having a variable frequency and voltage, and of being adapted to the requirements of the network in order to supply it with electrical energy having an approximately constant frequency and voltage. It is also possible to direct the energy generated by the wind power station entirely across the converter (S. Heier, Ibid., page 119, figures b, i, j, h) or only partially across the converter (S. Heier, Ibid., page 119, figures e, f).

Due to new legal regulations, the use of converter systems described above has unfortunately become difficult in terms of the above-described requirement to supply short-circuit current for a brief period of time. Due to their large iron and copper masses, which amount to a few tons in the case of stations having outputs in the megawatt range, generators are easily capable of carrying a high short-circuit current over the aforementioned time periods of, e.g., 100 ms to 200 ms. However, if the generators include converters, then, given the same output, the energy conversion is concentrated on very small semiconductor chips that are used as the converters and weigh only a few grams. They would be destroyed by heat within the aforementioned time periods if they carried inherent short-circuit currents. A conflict therefore results in that the short-circuit current is desired per se, but the converters and other parts of the control/regulating devices of a wind power station must be protected against this short-circuit current.

This results in the following limitations regarding the use of the various conversion systems:

If synchronous generators are used that are coupled directly to the network (S. Heier, Ibid., page 119, figure g), then delivering short-circuit currents does not pose a problem, i.e., due to the generator design, short-circuit currents may flow directly through the stator which is connected directly to the network, thereby ensuring that protective devices that are present in the network are reliably triggered. However, since conversion systems of that type—which are ideal per se due to their other properties, and which are basically also suitable for use in wind power stations—must be operated across multiple-staged gear ratios or using multiple-poled generators if direct mechanical coupling is involved, they are susceptible to vibrations and are therefore not used in wind power stations.

Synchronous and asynchronous generators that include converters, via which the total current or all of the electrical energy is supplied to the network, are not suited for use to carry short-circuit currents since they would immediately destroy the sensitive parts of the converter systems. It is therefore known to provide converter systems of that type with means that limit the current, if it increases, to critical values of, e.g., 10% to 20% above the nominal current. This results in the advantage that the converters are protected against overload. A disadvantage also results, however, in that no short-circuit current is delivered to the network for an adequate period of time since the current-limiting means must limit current within microseconds in order to become effective.

Finally, conversion systems that include double-fed asynchronous generators having slipring rotors instead of short-circuit rotors (S. Heier, Ibid., page 119, figures e, f) are considered to be an advantageous combination of the above-described conversion systems in terms of delivering short-circuit currents, and they are also used to advantage in wind power stations having outputs greater than 1 MW. Since the stator of the generator is connected directly to the network, it may be easily used, in principle, to deliver short-circuit currents. This design poses a problem, too, however, in that the rotor is connected to the network via converters that are incapable of carrying short-circuit currents, and must therefore be protected from them. To protect asynchronous generators of that type, it is known (DE 101 19 624 A1) to provide them with a switching device that includes a means for detecting short-circuit currents, and is designed such that, when it detects a short-circuit current, it separates a machine-side converter from the rotor, and connects the rotor to an auxiliary resistor. As a result, the rotor current is limited and reduced, and the stator current is allowed to decay. The generator is therefore no longer controllable. As a result, the entire converter is protected against short-circuit currents. In this case as well, however, since the switching procedure is carried out so soon or quickly that inadequate short-circuit current is delivered, any protective devices that are present in the network may not be reliably triggered.

Given that a short-circuit current is not supplied to the network when the above-described systems are used, the fact that any protective devices present there may not be triggered is not the only risk. That is, if a current that has indeed been reduced but is still, e.g., 10% or 20% higher than the nominal current is delivered to the network, as is the case for some of the systems described above, then the case may occur in which a device that should be protected but became damaged—but not destroyed—at the onset of the short circuit is subsequently damaged since current continues to flow. This may have serious consequences, such as cables catching fire, and it contradicts the mandatory safety requirements.

In light of the above-referenced prior art, a need therefore exists for converter systems that, if a short circuit occurs, deliver a short-circuit current to the network that is sufficiently high and lasts for an adequate length of time, while also protecting its owns components against inherent short-circuit currents.

Since converter systems that are operated using synchronous generators have the disadvantage that they are incapable of carrying short-circuit currents, the present invention proposes to make a double-fed, converter-utilizing synchronous generator suitable for use for the aforementioned purposes.

On the basis of the method referred to initially, and on the basis of the double-fed asynchronous generator, the present invention addresses the technical problem of designing both of them such that the asynchronous generator may deliver the desired short-circuit current without the risk that components required for its operation are not destroyed by the occurrence of inherent short-circuit currents.

This problem is solved according to the present invention by the characterizing features of claims 1 and 7.

The present invention is based on the knowledge that double-fed asynchronous generators are coupled directly to the network and are therefore capable, in principle, of providing short-circuit power. To accomplish this, however, the magnetic field of the rotor must be maintained at its instantaneous level and angular position relative to the stator field, i.e., in a field-oriented manner, and with consideration for the formula $$\omega 2/p2 = \omega 1/p1 - \omega \text{mech}$$

in which $\omega 1$ is the angular speed of the rotating stator field, $\omega 2$ is the electrical angular speed of the rotor field, $\omega$mech is the mechanical angular speed of the rotor, $p1$ is the number of stator pole pairs, and $p2$ is the number of rotor pole pairs. According to the present invention, this is attained by maintaining the generator excitation, thereby allowing transient stator short-circuit currents to build up.

In other words, the present invention thereby provides the advantage that, if a short circuit occurs, the magnetic flux in the rotor of the generator is not fully interrupted, as usual, by a converter being shut off, but instead, the operating value present at the time is frozen, i.e., retained via a targeted control intervention. As is the case with the known switching devices, the control intervention may take place very rapidly, thereby protecting sensitive parts of the synchronous generator, while—analogous to a synchronous generator that is coupled directly to the network—a short-circuit current that is specified by the generator design may be simultaneously built up in the stator winding and supplied to the network. To particular advantage, it is also possible to increase or lower the inherent short-circuit currents by introducing correction values, and to thereby adapt them, e.g., to specific requirements of the network. The asynchronous generator according to the present invention may therefore be used advantageously in wind power stations and in off-shore locations in particular.

Further advantageous features of the present invention result from the dependent claims.

The present invention is explained below in greater detail with reference to the attached drawings.

FIGS. 4 and 3 show, in schematic partial views of FIG. 1, means for modifying actual values and setpoint values—if a short circuit occurs—using correction values derived from the generator output.

Figure 1:
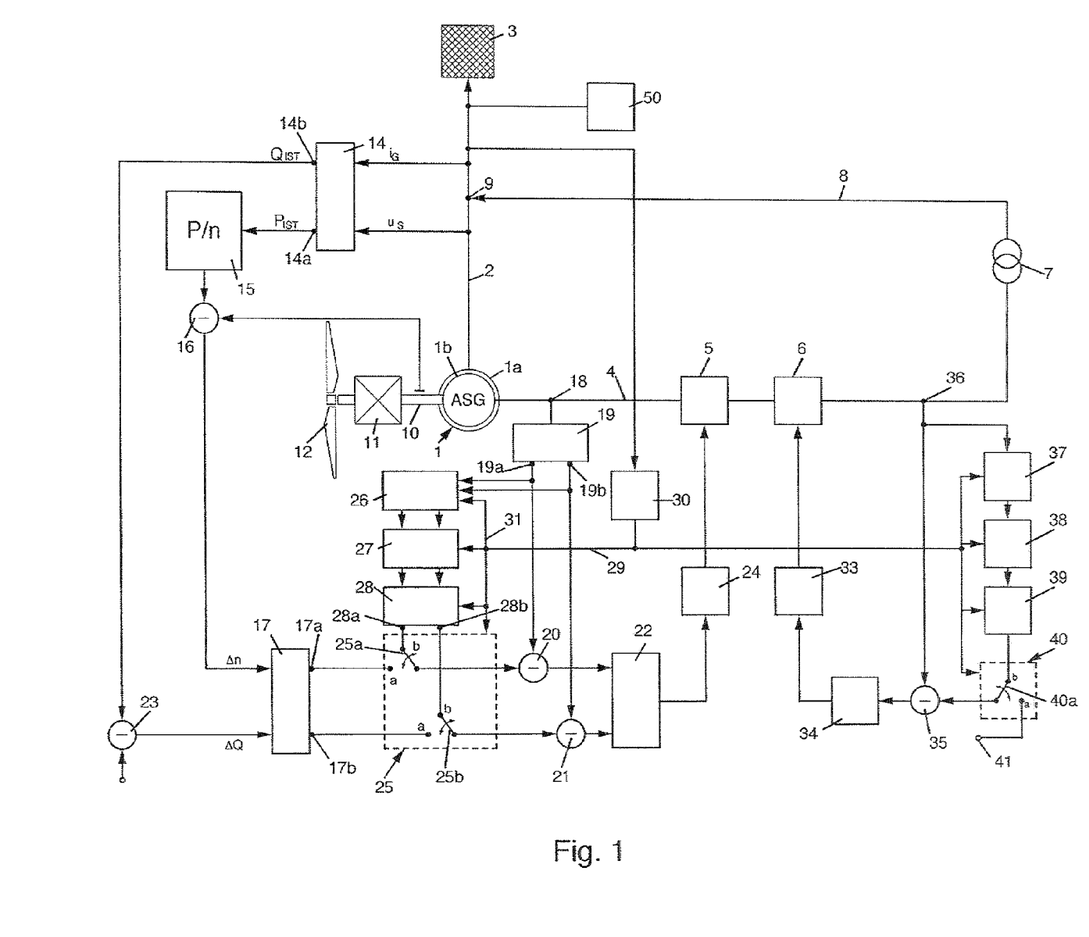
FIG. 1 shows a known double-fed asynchronous generator that has been modified according to the present invention, and that is used to supply electrical energy, which has been generated by a wind power plant, for example, to a three-phased power supply network.

FIG. 1 is a schematic depiction of a variable-speed converter system in the form of a double-fed asynchronous generator which, for simplicity, includes all components and devices that are required to operate the generator which is labeled with reference numeral 1. The asynchronous generator includes a stator 1a which may be connected via a line 2 directly to a three-phased power supply network 3, and a rotor 1b which is connected via a line 4 to a machine-side or rotor-side converter 5. Converter 5 is connected to a further, network-side converter 6 which is also connected to network 3, via a transformer 7 and a line 8, at a connection point 9 with line 2.

Rotor 1b of generator 1 is fixedly connected via a shaft 10 to the output of a drive which, in the embodiment, includes a transmission 11 and a turbine 12, the output shaft of which is connected to the input of transmission 11. Turbine 12 is, e.g., a component of a typical wind power station. The gear ratio of transmission 11 is selected such that, when turbine 12 operates at a speed, e.g., of 10 RPM, rotor 1b rotates at a speed of, e.g., 1200 RPM which corresponds to a frequency of 40 Hz. For the rest, it is clear that, instead of parts 11 and 12, other drives could also be connected to rotor 1b.

FIG. 1 likewise shows, in a schematic manner, known devices that are used to regulate the double-fed asynchronous generator. Although not depicted, they include a device for transforming the active components and reactive components of the total output into a rotating 2-axis coordinate system with d as the direct-axis component and q as the q-axis component, in order to largely decouple the effective power and the largely corresponding level of machine torque, as well as the reactive power, and to be able to regulate the two variables separately without their influencing each other. In addition, in order to utilize the advantages of the variability of the rotating speed, the total power PG is influenced by the regulation in that the turbine speed is specified on the basis of the associated output/RPM characteristic curves. To this end, the rotating speed is influenced via the torque which is adjusted in a field-oriented manner using machine-side converter 5 via q-axis component iRMq of rotor current iRM. In an analogous manner, the effective power may be, e.g., fixedly specified, or it may also be controlled via the direct-axis component iRMd of rotor current iRM via converter 5.

According to the embodiment shown in FIG. 1, the actual value of total current iG, which is obtained from the three phases and is supplied to network 3, is determined for the aforementioned purpose at a point that lies in the direction of network 3 behind connection point 9. Current iG is supplied to a device 14, in which a coordinate transformation from the stationary 3-axis coordinate system into the rotating 2-axis coordinate system (Park transformation) is carried out, and a direct-axis current component and a q-axis current component are determined from total current iG. In a similar manner, stator voltage US is measured at a point that lies in the direction of network 3 ahead of connection point 9, and it is converted in device 14 into a d-axis component and a q-axis component. On the basis of the current and voltage components obtained in this manner, or in any other expedient manner, the active and reactive outputs, Pist and Qist, which are output by the asynchronous generator, are calculated and made available at outputs 14a and 14b of device 14.

Value Pist is supplied to a component 15, in which the P/n characteristic curves that belong to the asynchronous generator are stored with reference to a table or the like; the P/n characteristic curves show the dependence of output effective power P on rotational speed n at which shaft 10 and, therefore, rotor 1b, are driven. In particular, one task of component 15 is to continually adapt the current rotor speed of generator 1 to the particular wind conditions. Wind power stations are normally designed for a certain nominal wind speed and a nominal rotational speed assigned thereto. Deviations from the nominal wind speed therefore result in a drop in output, even if the nominal rotational speed would be retained. However, it is known that every wind speed has a P/n characteristic curve that has a maximum output at a given rotational speed (S. Heier, Ibid., pages 98, 99 and FIG. 2.64). This is taken into account in terms of control as follows:

By comparing current output Pist to the family of characteristics stored in component 15, the optimal rotational speed nsoll is determined and transmitted to an output of component 15. Rotational speed nsoll is then adjusted, in the case of the asynchronous generator depicted in FIG. 1, using rotor-side converter 5. As is known, the acceleration torque of generator 1 for the moving masses (turbine 12, rotor 1b) is composed of a mechanical drive torque, which is generated by the wind speed and the turbine blade setting, and an electrical load (resistance) torque which is generated by generator 1 itself. The load torque may be adjusted using converter 5 or current iRM, which is supplied by rotor 1b, by regulating it in terms of frequency, amplitude, and angular position relative to the stator field. As a result, it is possible to regulate the mechanical speed nist of rotor 1b in such a manner that it substantially corresponds to specified setpoint value nsoll.

To this end, in the case of the asynchronous generator depicted in FIG. 1, actual rotational speed nist, which is measured, e.g. at shaft 10, is compared in a comparator 16 to setpoint rotational speed nsoll, which is specified by component 15. Differential signal Δn is supplied to a device, which is referred to here as setpoint value generator 17, of a complex closed-loop control device, the exact design of which is not relevant to the purposes of the present invention. In setpoint value generator 17, input values Δn are converted into setpoint values iRMqsoll for the q-axis component, and into iRMdsoll for the direct-axis component of rotor current iRM, and they are output at an output 17a and 17b. The actual value of rotor current iRM is measured at a connecting point 18, which is located between rotor 1a and machine-side converter 5, using a device which is referred to here as an actual value generator. Similar to device 14, the actual value generator forms, via transformation, a q-axis component iRMqist, and a direct-axis component iRMdist, both of which are output at outputs 19a and 19b. These values are compared in comparators 20 and 21 to setpoint values iRMqsoll and iRMdsoll, which are generated by setpoint value generator 17, for the q-axis and direct-axis components of machine-side rotor current iRM. The differences of these currents are supplied to a controller 22.

While setpoint values iRMqsoll are formed in setpoint value generator 17 on the basis of rotational speed difference Δn, the iRMdsoll values are calculated on the basis of actual reactive powers Qist, which are generated by device 14, and associated setpoint values Qsoll, which are compared in a comparator 23 and are likewise supplied to setpoint value generator 17 in the form of a differential signal ΔQ. Differential signals ΔQ are used in a manner that is not essential to the present invention to regulate the reactive power that is made available and required by the asynchronous generator. They are converted in setpoint value generator 17 into corresponding values iRMdsoll, and they are output at an output 17b.

In controller 22, the differential values for iRMq and iRMd, which are output by comparators 20 and 21, are transformed back into the stationary coordinate system in order to obtain three associated phase-to-phase voltages. Finally, these phase-to-phase voltages are supplied, in a manner known per se, to a PWM component 24 (PWM=pulse-width modulation), the output signals of which are supplied to machine-side converter 5, in order to regulate it in accordance with the requirements. As a result, in particular, machine-side rotor current iRM is adjusted such that rotor 1b rotates substantially at rotational speed nsoll which was determined in component 15.

Control systems of the type depicted in FIG. 1 are generally known in the field of wind power stations (S. Heier, Ibid., pages 324 through 327, and FIG. 5.20), and so further details need not be provided. Regardless, it basically does not matter how the control of the rotor speed and the reactive power is actually carried out. FIG. 1 presents a preferred embodiment, however.

Furthermore, known asynchronous generators are provided with switching devices that are installed, e.g., between rotor 1b and connecting point 18, and that are used to entirely decouple rotor 1b from converter 5 when a short circuit occurs. In contrast, the present invention provides a switching device 25 that is suitable for disconnecting only setpoint value generator 17 from the rest of the control device if a short circuit occurs and, instead, to retain and "freeze" the machine-side rotor current iRMist that is currently present. The steps involved are as follows:

Outputs 19a, 19b of actual value generator 19 are connected to a measuring device 26, via which the output values are monitored continually at outputs 19a, 19b. A short circuit may be determined, e.g., by measuring total current iG, or by determining the voltage gradients (e.g., dUS/dt) specific to the network, or by monitoring the network impedance in terms of pulsed quantities.

A memory device 27 is connected to measuring device 26, and to an output device 28. Output device 28 includes two outputs 28a and 28b; output 28a is assigned to q-axis component iRMq, and output 28b is assigned to direct-axis component iRMd of current iRMist. In addition, three components 26, 27 and 28 are connected via a control line 29 to an error or short-circuit detector 30, via which the currents flowing in network 3 or line 2 may be monitored. If these currents exceed a specified setpoint value, error detector 30 outputs an error signal at its output to control line 29. As a result, values iRMqist and iRMdist detected by measuring device 26 at this instant are transferred to memory device 27, and, from there, are delivered as new setpoint values to outputs 28a and 28b of output device 28.

As further shown in FIG. 1, switching device 25 includes two switch contacts 25a and 25b which are indicated schematically. Switch contact 25a is fixedly connected to comparator 20, and switch contact 25b is fixedly connected to comparator 21. In addition, switch contact 25a may be switched from a normal position a, in which it is connected to output 17a of setpoint value generator 17, into a position b, in which it is connected to output 28a of output device 28. Accordingly, switch contact 25a may be switched from a position a, in which it is connected to output 17b, into a position b, in which it is connected to output 28b. Finally, switch device 25 is also connected via a line 31 to control line 29. As a result, switch contacts 25a and 25b, which are in normal position a during normal operation of the wind power station, are immediately switched to position b when a short circuit occurs. As a result, controller 22 is decoupled from setpoint value generator 17 after this switch takes place, with the result that the control is now carried out with reference to the setpoint values that are present at outputs 28a and 28b, and that correspond to values iRMqist and iRMdist that are present when the short circuit occurs. This means that, as events progress, machine-side rotor current iRM retains its value that is present at the instant when the short circuit occurs, i.e., this value is "frozen".

The present invention therefore ensures that, despite the presence of a short circuit, rotor-side converter 5 is loaded substantially only with a current that occurs during normal operation, thereby ensuring that its sensitive components do not become damaged. On the other hand, the stator current may increase over so many periods of the network voltage to an, e.g., 5 to 15-fold value, which causes all protective devices present in network 3 to be reliably triggered, that the instruments and devices connected thereto do not become damaged, either.

The above-described state may therefore be maintained for a time period that is long enough (e.g., 2 periods of the network voltage) for the protective devices to be triggered. Afterward, the wind power station may be shut down in the usual manner, or, as soon as the source of the short circuit has been eliminated, it may be operated further using switching device 25 which is located in positions a.

Similar to converter 5, network-side converter 6 may be controlled using a PWM controller 33 which is located at the output of a regulator 34. The difference between a setpoint value iRNsoll and an actual value iRNist, which is measured at a connecting point 36 located between converter 6 and transformer 7, is supplied as the input signal to regulator 34. If the intention is to also protect converter 6 against short-circuit currents, the following steps are taken, which are similar to the control of converter 5, described above.

A measuring device 37 is connected to connecting point 36, via which network-side rotor current iRN flowing between converter 6 and transformer 7 is continually monitored. A memory device 38 is connected to measuring device 37, and to an output device 39. It includes an output that outputs a value iRNist that corresponds to the current actual value of the converter current. In addition, components 37, 38, and 39 are connected via control line 29 to error detector 30. Finally, output of device 39 is connected to a switching device 40 which includes a switch contact 40a and is controlled by error detector 30. Switch contact 40a is fixedly connected to the input of comparator 35, and it may be switched between a position a, in which it is connected to a terminal connection 41 for value iRNsoll, into a position b, in which it is connected to the output of output device 39.

For the rest, it is understood that switching device 40, as is switching device 25, is preferably composed of electronic switching elements that may be controlled directly via the control signals in control line 29.

As a result of the above-described configuration, when a short circuit occurs, switching device 40 is switched from position a to position b, and, as a result, actual current iRNist is supply, as the new setpoint value, via connecting point 36 to comparator 35, thereby resulting in the current being frozen by converter 6 to the value that was present when a short circuit occurred. As a result, it is ensured that converter 6 is also protected against short circuits.

Since the short-circuit power is ultimately influenced by machine-side converter 5, it is easily possible, according to further embodiments of present invention, to adapt the short-circuit power to network-specific requirements, or to requirements that are desired by the operator of the wind power station. In the most general case, this takes place by modifying the values supplied to regulator 22 as a function of total current iG or total power PG, QG of generator 1.

Figure 2:
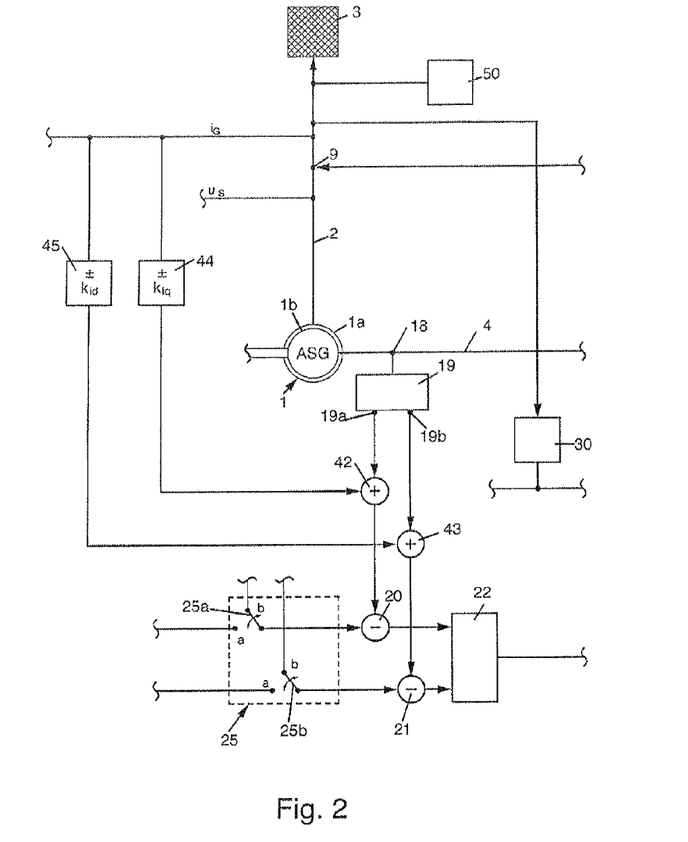
FIGS. 2 and 3 show, in schematic partial views of FIG. 1, means for modifying actual values and setpoint values—if a short circuit occurs—using correction values derived from the total current of the generator.

FIG. 2 shows an embodiment of an actual value correction. Components that are the same are labelled with the same reference numerals in FIG. 2 as in FIG. 1. In addition, all components that are not required to explain the correction are left out of FIG. 2.

As shown in FIG. 2, the actual value is corrected by installed a component 42, 43 is installed in each of the lines that lead from outputs 19a, 19b of actual value generator 19 to corresponding comparators 20, 21; components 42, 43 modify current actual value iRMqist or iRMdist using a correction value ±kiq or ±kid, and are, e.g., a summing step. Correction value ±kiq or ±kid is formed, e.g., in a multiplication step 44, 45, to the inputs of which total current iG of the asynchronous generator are supplied, and the outputs of which are connected to components 42, 43. In multiplication steps 44, 45, total current iG is multiplied, e.g., by a preset factor that may be less than or greater than 1, and that may be positive or negative. Correction value kiq, kid obtained as a result is added to or subtracted from particular actual value iRMqist or iRMdist. Accordingly, the short-circuit current, which forms in the frozen state and which may amount to, e.g., 5 to 15 times the nominal current, is increased or reduced, or limited to a preselected maximum value.

Figure 3:
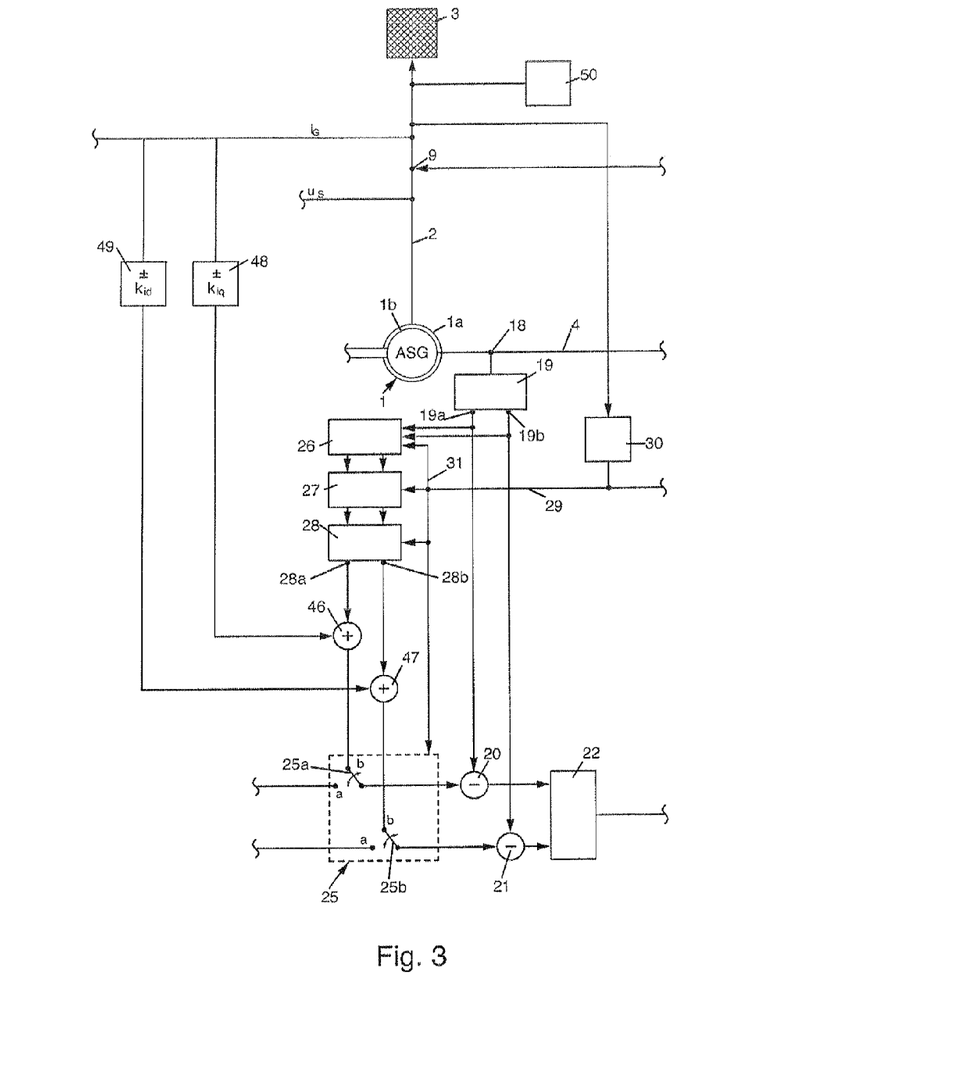

As depicted in FIG. 3, in which components that are the same are labelled with the same reference numerals as in FIGS. 1 and 2, the short-circuit current is modified via a setpoint value correction; to this end, summing steps 46, 47 are included in the output lines of output device 28, which lead to switching device 25. As also indicated in FIG. 2, multiplication steps 48, 49 are also provided, to which a value that corresponds to total current iG is supplied, and in which value iG is multiplied by a preselected factor. The value obtained as a result is supplied to summing steps 46, 47, thereby causing frozen values iRMqist and iRMdist to be modified accordingly if a short circuit occurs.

Figure 4:
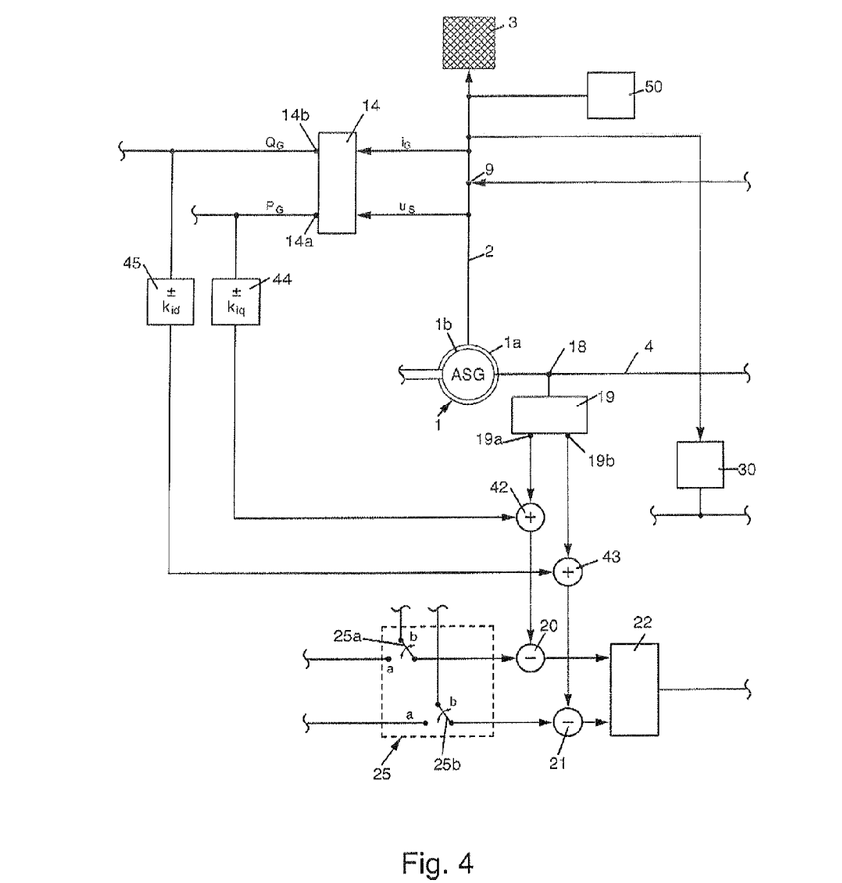
Figure 5:
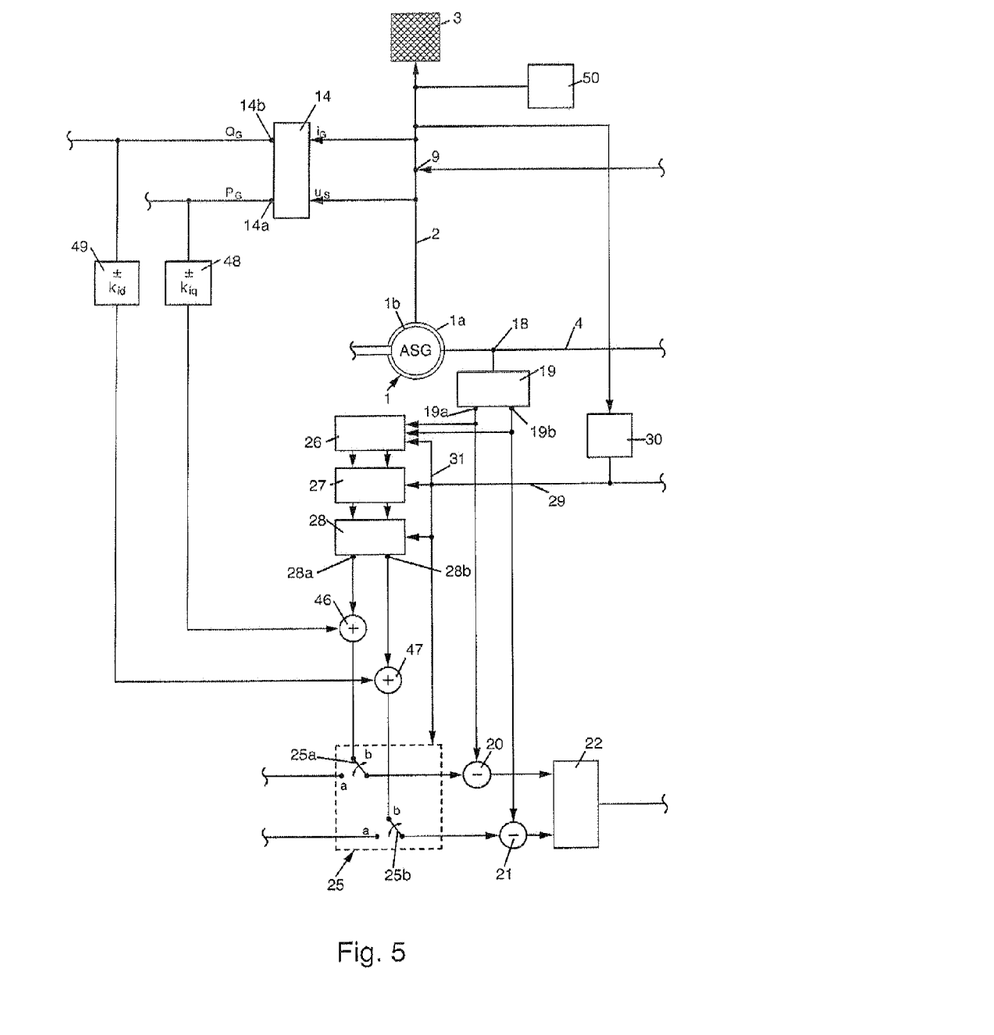

As an alternative, the influence on the short-circuit current may be made dependent on the effective power and/or the reactive power of the generator. This is depicted schematically in FIGS. 4 and 5 which otherwise correspond to FIGS. 2 and 3. The q-axis component is preferably modified using a correction value derived from effective power Pist at output 14*a*, while the direct-axis component is modified using a correction value derived from reactive power Qist at output 14*b*.

For the rest, summing steps 42, 43, 46 and 47 are advantageously likewise connected to control line 29, and they are designed such that they are active only when a short circuit is detected.

Apart from this, it is clear that an overcurrent protective device 50 may also be assigned to line 2, which leads to network 3, and which becomes active if excessive short-circuit currents occur, thereby resulting in a limitation of current or causing the wind power station to be shut off, by adjusting the blade angle of turbine 12 accordingly.

The present invention is not limited to the embodiments described, which could be modified in various manners. This applies in particular to the regulating circuit depicted in FIG. 1, which may be modified in various manners and adapted to the needs of a particular case, with or without transforming the currents, which belong to the three phases, into a rotating coordinate system. This makes sense for three-phased networks, however. In addition, the regulation may be realized in a digital or analog manner, and, selectively, using hardware and/or software means. Furthermore, it is clear that the actual values of the rotor currents, which are present when a short circuit occurs, may also be frozen in a manner other than that described here. The same applies for the modification (correction) of the actual values and setpoint values described herein. Furthermore, the double-fed asynchronous generator described herein may also be operated in conjunction with drives other than the drive depicted in FIG. 1. Finally, it is understood that the various features may also be used in combinations other than those described and depicted herein.

What is claimed is:

1. A method for operating a double-fed asynchronous generator comprising a stator (1*a*) and a slipring rotor (1*b*); the method includes the following steps: Connect the stator (1*a*) to a power supply network (3), mechanically connect the rotor (1*b*) to a drive (11, 12), electrically couple the rotor (1*b*) via a machine-side converter and a power supply-side converter (5,6) to the network (3), monitor the network (3) to detect short-circuit current, supply a field-oriented current to the rotor (1*b*) at a frequency that substantially corresponds to the difference between the electrical network frequency and a mechanical frequency derived from the drive RPM, and regulate the machine-side rotor current, at the least, by determining the actual values (iRMist) of the machine-side rotor current (iRM) and adjusting them to setpoint values that are selected depending on desired operating conditions, wherein, if short circuits are detected in the network (3), the actual value (iRMist) of the machine-side rotor current (iRM) present at that time is detected, retained (frozen), and used in place of the selected setpoint values to regulate the machine-side rotor current, and therefore the stator (1*a*) delivers short-circuit current to the network (3).

2. The method as recited in claim 1, wherein the machine-side rotor current (iRM), with all three phases, is transformed into a rotating coordinate system, forming q-axis currents and direct-axis currents (iRMq, iRMd), and the machine-side rotor current (iRM) is retained (frozen) by using the q-axis current (iRMq).

3. The method as recited in claim 1, wherein, if a short circuit occurs, the power supply-side rotor current (iRN) is likewise regulated, by detecting actual values (iRNist) of the power supply-side rotor current (iRN), recording (freezing) them, and using them in place of selected setpoint values (iRNsoll) to regulate the power supply-side rotor current.

4. The method as recited in claim 1, wherein the retained (frozen) actual values that are used for regulation if a short circuit occurs are modified using correction values (±kiq, ±kid) which are derived from the total current (iG) of the generator (1).

5. The method as recited in claim 1, wherein the retained (frozen) actual values that are used for regulation if a short circuit occurs are modified using correction values (±kiq, ±kid) which are derived from the total output (PG, QG) of the generator (1).

6. The method as recited in claim 1, wherein the retained (frozen) state of the actual values is maintained for a preselected length of time.

7. A double-fed asynchronous generator, comprising: a stator (1*a*) that may be connected directly to a power supply network (3), a slipring rotor (1*b*) that is coupled mechanically to a drive (11, 12), and electrically to the network (3) via a machine-side converter and a power supply-side converter (5, 6), a means (30) which is connected to a switching device (25) for detecting short-circuit currents in the network (3), and a regulating circuit for performing the field-oriented regulation of the rotor-side converter (5) in such a manner that the rotor (1*b*) is always supplied with a current, the frequency of which substantially corresponds to the difference between the electrical power frequency and a mechanical frequency derived from the drive RPM, in which case the regulating circuit includes an actual value transmitter (19) for transmitting actual values (iRM) of at least one machine-side rotor current (iRM), and a setpoint value transmitter (17) for transmitting setpoint values—which are selected depending on desired operating conditions—for the machine-side rotor current (iRM), wherein the switching device (25) is connected to the setpoint value transmitter (17) and the actual value transmitter (19) in such a manner that, if a short circuit occurs, the setpoint value transmitter (17) is separated from the regulating circuit and, instead, the actual value of the machine-side rotor current (iRM) that is currently present is retained (frozen), and is used as the new setpoint value, and therefore the stator (1*a*) may deliver short-circuit current to the network (3).

8. The double-fed asynchronous generator as recited in claim 7, wherein outputs (19*a*, 19*b*) of the actual value transmitter (19) are connected to means (42 through 45) for modifying the actual values using correction values (±kiq, ±kid).

9. The double-fed asynchronous generator as recited in claim 7, wherein outputs (28*a*, 19*b*) of the actual value transmitter (28) are connected to means (46 through 49) for modifying the actual values using correction values (±kiq, ±kid).

10. The double-fed asynchronous generator as recited in claim 7,
wherein
it is a component of a wind power station.

11. A double-fed asynchronous generator,
wherein
it includes a measuring device (26) that is connected to the actual value transmitter (19), and an output device (28) which is connected to the former and is used for actual values of the machine-side rotor current that are determined if a short circuit occurs, and the switching device (25) may be switched between the setpoint value transmitter (17) and the output device (28).

* * * * *